(12) United States Patent
Ghafoori et al.

(10) Patent No.: US 12,631,463 B2
(45) Date of Patent: May 19, 2026

(54) ROUTE IDENTIFICATION AND CLUSTERING FOR REAL-TIME MAPPING

(71) Applicant: Apple Inc., Cupertino, CA (US)

(72) Inventors: Fatemeh Ghafoori, Santa Clara, CA (US); Christina Selle, Los Altos, CA (US); Christine Zhu, Sunnyvale, CA (US); Michael P. Dal Santo, San Francisco, CA (US); Venkata Sai Sriharsha Sammeta, Sunnyvale, CA (US); Kevin M. Lynch, Woodside, CA (US)

(73) Assignee: Apple Inc., Cupertino, CA (US)

( * ) Notice: Subject to any disclaimer, the term of this patent is extended or adjusted under 35 U.S.C. 154(b) by 173 days.

(21) Appl. No.: 17/968,758

(22) Filed: Oct. 18, 2022

(65) Prior Publication Data

US 2023/0392949 A1 Dec. 7, 2023

Related U.S. Application Data

(60) Provisional application No. 63/349,039, filed on Jun. 3, 2022.

(51) Int. Cl.
G01C 21/36 (2006.01)
G01C 21/00 (2006.01)
G01C 21/34 (2006.01)

(52) U.S. Cl.
CPC ..... *G01C 21/3617* (2013.01); *G01C 21/3484* (2013.01); *G01C 21/3641* (2013.01); *G01C 21/3676* (2013.01); *G01C 21/3804* (2020.08)

(58) Field of Classification Search
CPC ............ G01C 21/3617; G01C 21/3484; G01C 21/3641; G01C 21/3676; G01C 21/3804
See application file for complete search history.

(56) References Cited

U.S. PATENT DOCUMENTS

| | | | | | |
|---|---|---|---|---|---|
| 3,056,035 | A | * | 9/1962 | Bernheim | .............. H01H 61/02 |
| | | | | | 439/642 |
| 8,589,075 | B1 | * | 11/2013 | Jones | ................. G01C 21/3676 |
| | | | | | 701/527 |
| 8,781,735 | B2 | * | 7/2014 | Udeshi | ................. G01C 21/367 |
| | | | | | 701/457 |
| 8,990,006 | B1 | * | 3/2015 | Wallace | .............. G01C 22/006 |
| | | | | | 701/408 |
| 10,220,258 | B2 | * | 3/2019 | Gu | .......................... G01S 19/42 |
| 10,300,334 | B1 | * | 5/2019 | Chuang | ................. G16H 50/30 |
| 10,515,101 | B2 | * | 12/2019 | Robb | .................... G06F 16/909 |
| 10,551,199 | B2 | * | 2/2020 | Haque | ................... G01C 21/30 |
| 10,989,544 | B2 | * | 4/2021 | Haque | ................... G01C 21/30 |
| 11,344,786 | B2 | * | 5/2022 | Intonato | ............ A63B 24/0062 |
| 12,270,664 | B2 | * | 4/2025 | Kitchen | ............ G01C 21/3484 |
| 2003/0036844 | A1 | * | 2/2003 | Balasuriya | .......... G09B 29/102 |
| | | | | | 701/533 |

(Continued)

*Primary Examiner* — Dale W Hilgendorf
(74) *Attorney, Agent, or Firm* — BAKERHOSTETELR

(57) ABSTRACT

The subject technology provides for route identification and clustering for real-time mapping. Various clustering techniques can identify groupings of relevant prior routes that can later be mapped against a current route. Filtering and matching techniques can be applied to identify and cluster prior routes. Tracked activity can also be compared against applicable prior activities to provide movement metrics and real-time comparisons between current and one or more recorded activities.

20 Claims, 14 Drawing Sheets

(56) References Cited

U.S. PATENT DOCUMENTS

| | | | | |
|---|---|---|---|---|
| 2005/0228553 A1* | 10/2005 | Tryon | ............... | B60L 50/16 |
| | | | | 701/22 |
| 2006/0136173 A1* | 6/2006 | Case | ............... | G01C 22/006 |
| | | | | 702/182 |
| 2009/0005965 A1* | 1/2009 | Forstall | ............. | G01C 21/3484 |
| | | | | 701/533 |
| 2010/0088023 A1* | 4/2010 | Werner | ............. | A63B 24/0062 |
| | | | | 455/566 |
| 2011/0066369 A1* | 3/2011 | Klassen | ............. | G01C 21/20 |
| | | | | 701/465 |
| 2012/0116550 A1* | 5/2012 | Hoffman | ............. | A61B 5/6898 |
| | | | | 700/91 |
| 2012/0143497 A1* | 6/2012 | Van Hende | ........ | G01C 21/3484 |
| | | | | 701/439 |
| 2012/0254226 A1* | 10/2012 | Shaw | ............... | G06F 16/258 |
| | | | | 707/769 |
| 2014/0288680 A1* | 9/2014 | Hoffman | ............. | G16H 20/30 |
| | | | | 700/91 |
| 2015/0081062 A1* | 3/2015 | Fyfe | ............... | G16H 20/30 |
| | | | | 700/91 |
| 2015/0081210 A1* | 3/2015 | Yeh | ............... | G01C 21/20 |
| | | | | 701/428 |
| 2015/0160026 A1* | 6/2015 | Kitchel | ............. | G01C 21/3667 |
| | | | | 701/533 |
| 2015/0330805 A1* | 11/2015 | Cho | ............... | H04W 4/02 |
| | | | | 701/428 |
| 2016/0161273 A1* | 6/2016 | Kitchel | ............. | G01S 19/19 |
| | | | | 701/464 |
| 2016/0320200 A1* | 11/2016 | Delling | ............. | G01C 21/3605 |
| 2016/0375306 A1* | 12/2016 | Gu | ............... | G01S 19/42 |
| | | | | 701/430 |
| 2017/0003138 A1* | 1/2017 | Cho | ............... | G01C 21/3664 |
| 2018/0348010 A1* | 12/2018 | Coleman | ............. | G01C 21/3626 |
| 2018/0364062 A1* | 12/2018 | Wang | ............. | G06Q 10/063114 |
| 2019/0063926 A1* | 2/2019 | Xu | ............... | G01C 21/3469 |
| 2019/0145779 A1* | 5/2019 | Li | ............... | G01C 21/20 |
| | | | | 701/423 |
| 2019/0204088 A1* | 7/2019 | Haque | ............. | G01C 21/30 |
| 2019/0316926 A1* | 10/2019 | Wang | ............. | G01C 21/3484 |
| 2020/0141753 A1* | 5/2020 | Li | ............... | G01C 21/3614 |
| 2020/0378776 A1 | 12/2020 | Omari et al. | | |
| 2021/0055117 A1* | 2/2021 | Dong | ............. | G01C 21/3484 |
| 2021/0108934 A1* | 4/2021 | Dasalukunte | ...... | G01C 21/3461 |
| 2022/0381564 A1* | 12/2022 | Kitchen | ............. | G01C 21/3484 |
| 2024/0377206 A1* | 11/2024 | Provenzano | ....... | G01C 21/3415 |

* cited by examiner

ACTIVITY SELECTION — 410

PRIOR ROUTE SELECTION — 420

PERFORMANCE SELECTION — 430

CUSTOMIZATIONS
(E.G., METRICS, ALERTS, NOTIFICATIONS, ETC.) — 440

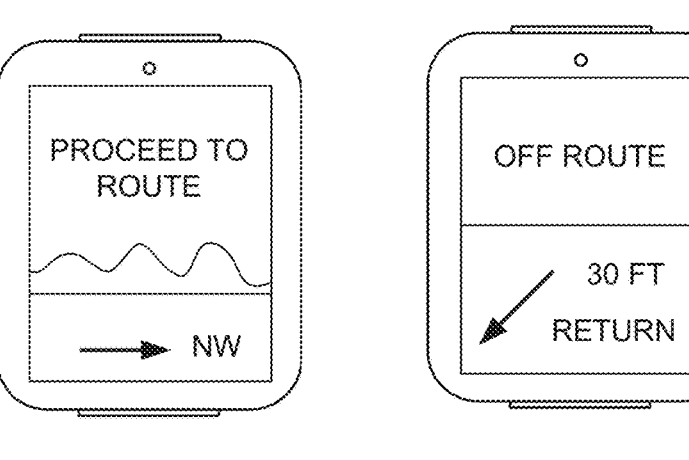
*FIG. 5A*          *FIG. 5B*          *FIG. 5C*
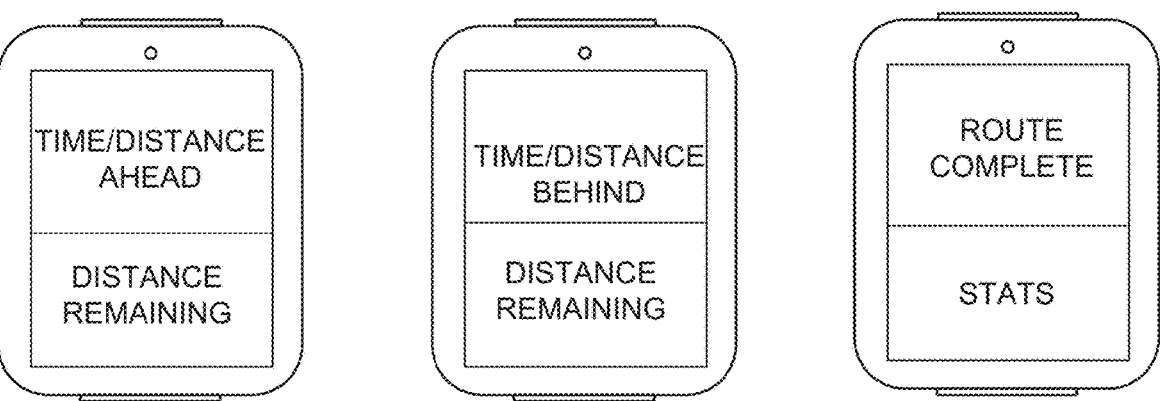
*FIG. 5D*          *FIG. 5E*          *FIG. 5F*

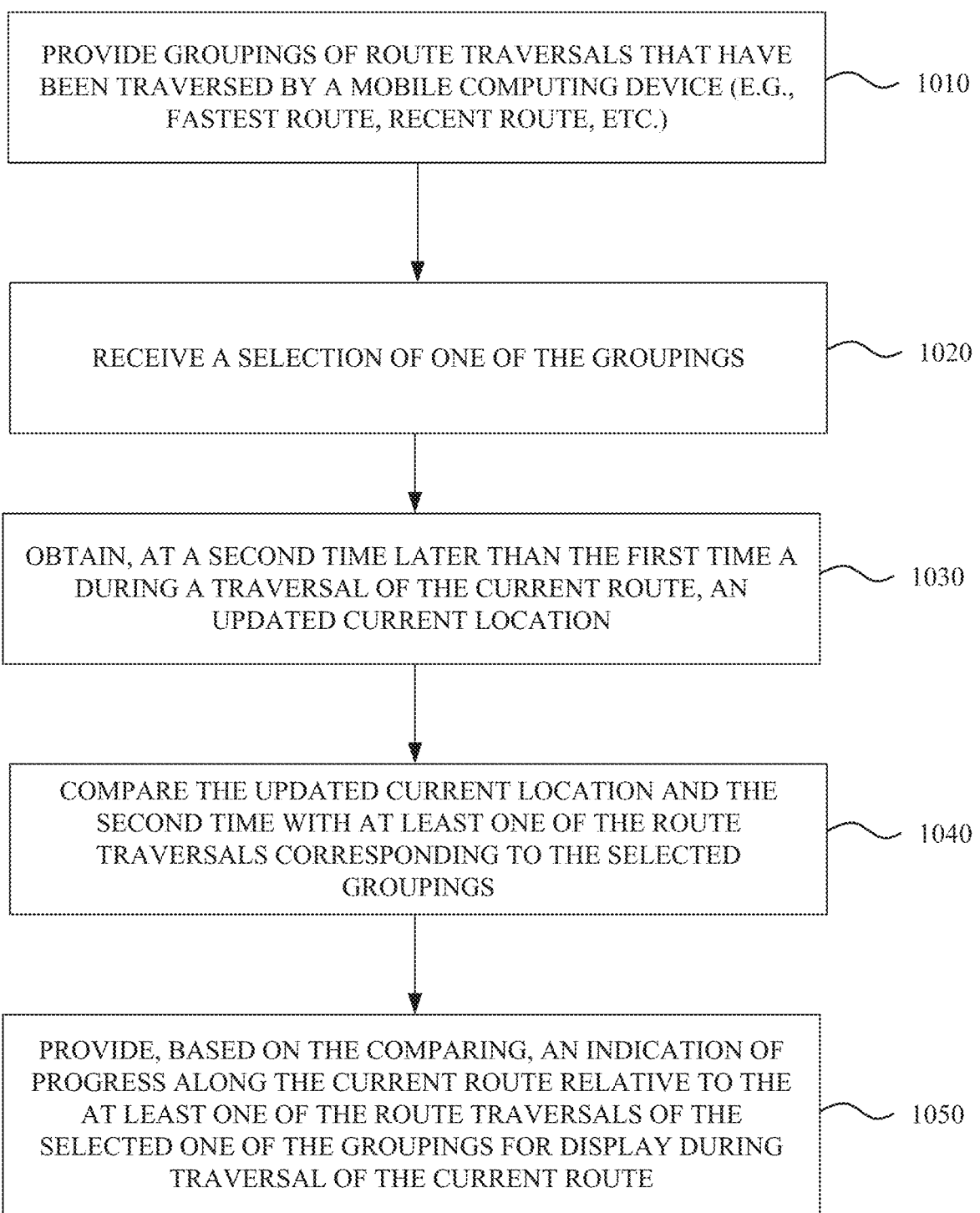

PROVIDE GROUPINGS OF ROUTE TRAVERSALS THAT HAVE BEEN TRAVERSED BY A MOBILE COMPUTING DEVICE (E.G., FASTEST ROUTE, RECENT ROUTE, ETC.) — 1010

RECEIVE A SELECTION OF ONE OF THE GROUPINGS — 1020

OBTAIN, AT A SECOND TIME LATER THAN THE FIRST TIME A DURING A TRAVERSAL OF THE CURRENT ROUTE, AN UPDATED CURRENT LOCATION — 1030

COMPARE THE UPDATED CURRENT LOCATION AND THE SECOND TIME WITH AT LEAST ONE OF THE ROUTE TRAVERSALS CORRESPONDING TO THE SELECTED GROUPINGS — 1040

PROVIDE, BASED ON THE COMPARING, AN INDICATION OF PROGRESS ALONG THE CURRENT ROUTE RELATIVE TO THE AT LEAST ONE OF THE ROUTE TRAVERSALS OF THE SELECTED ONE OF THE GROUPINGS FOR DISPLAY DURING TRAVERSAL OF THE CURRENT ROUTE — 1050

FIG. 10

RECEIVE PREVIOUS ROUTES TRAVERSED BY A MOBILE COMPUTING DEVICE — 1110

PRE-FILTER THE PREVIOUS ROUTES BASED ON A ROUTE CHARACTERISTIC — 1120

APPLY DYNAMIC TIME WARPING — 1130

CLUSTER ROUTES INTO GROUPINGS OF ROUTES — 1140

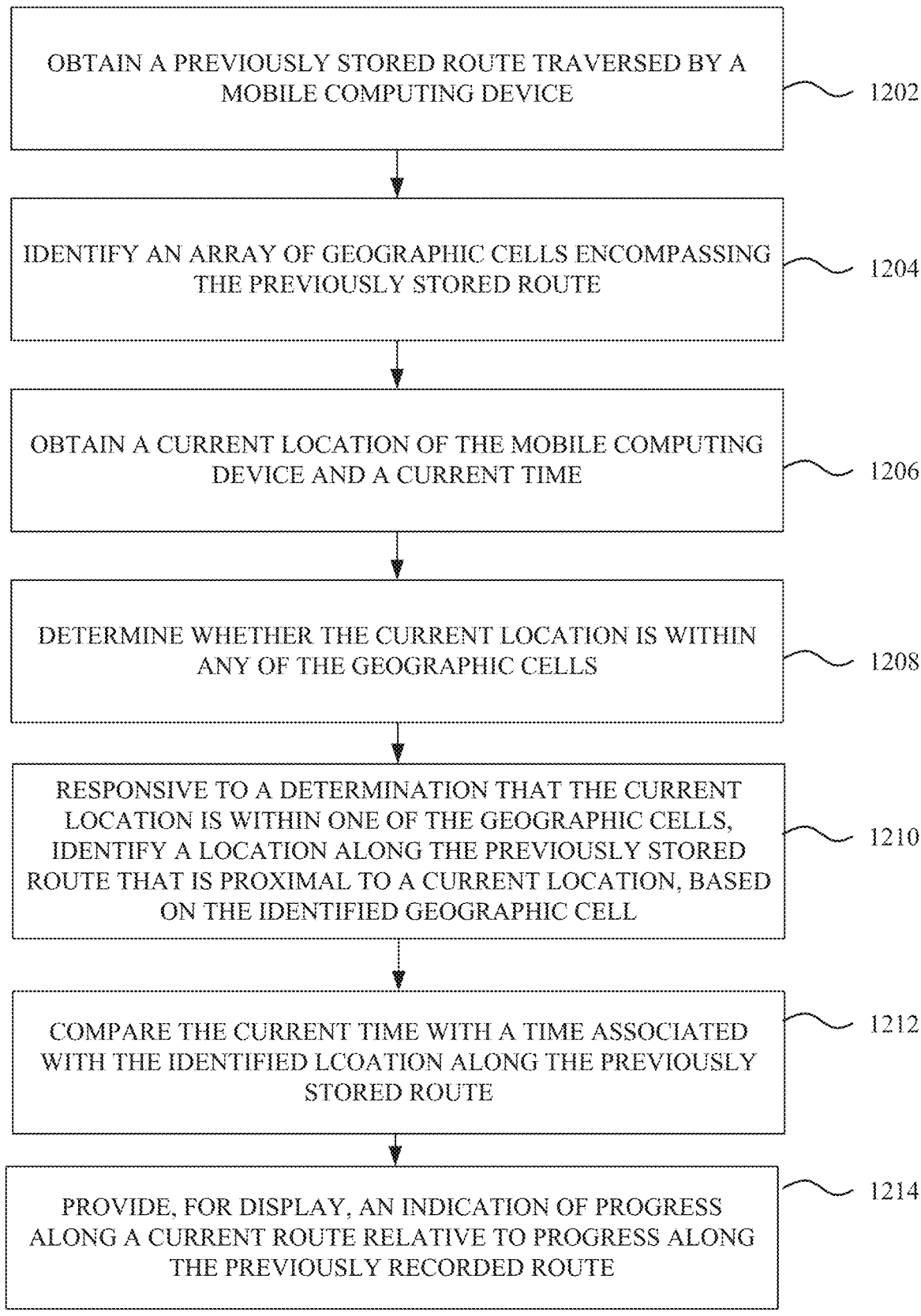

OBTAIN A PREVIOUSLY STORED ROUTE TRAVERSED BY A MOBILE COMPUTING DEVICE ⁓ 1202

IDENTIFY AN ARRAY OF GEOGRAPHIC CELLS ENCOMPASSING THE PREVIOUSLY STORED ROUTE ⁓ 1204

OBTAIN A CURRENT LOCATION OF THE MOBILE COMPUTING DEVICE AND A CURRENT TIME ⁓ 1206

DETERMINE WHETHER THE CURRENT LOCATION IS WITHIN ANY OF THE GEOGRAPHIC CELLS ⁓ 1208

RESPONSIVE TO A DETERMINATION THAT THE CURRENT LOCATION IS WITHIN ONE OF THE GEOGRAPHIC CELLS, IDENTIFY A LOCATION ALONG THE PREVIOUSLY STORED ROUTE THAT IS PROXIMAL TO A CURRENT LOCATION, BASED ON THE IDENTIFIED GEOGRAPHIC CELL ⁓ 1210

COMPARE THE CURRENT TIME WITH A TIME ASSOCIATED WITH THE IDENTIFIED LCOATION ALONG THE PREVIOUSLY STORED ROUTE ⁓ 1212

PROVIDE, FOR DISPLAY, AN INDICATION OF PROGRESS ALONG A CURRENT ROUTE RELATIVE TO PROGRESS ALONG THE PREVIOUSLY RECORDED ROUTE ⁓ 1214

*FIG. 12*

ROUTE IDENTIFICATION AND CLUSTERING FOR REAL-TIME MAPPING

CROSS REFERENCE TO RELATED APPLICATIONS

This application claims the benefit of priority to U.S. Provisional Patent Application No. 63/349,039, entitled, "Route Identification and Clustering for Real-Time Mapping", filed on Jun. 3, 2022, the disclosure of which is hereby incorporated herein in its entirety.

TECHNICAL FIELD

The present description relates generally to mapping routes during an event during which movements are tracked, and in particular, for example, to route identification and clustering for real-time mapping.

BACKGROUND

Many individuals engaging in physical activity seek to quantify their performance. Runners, walkers, cyclists, and other individuals who choose to exercise may want to track their movements to quantify aspects of their physical activity, such as distance or time spent engaged in the activity. Portable electronic devices, fitness trackers, and other wearable devices can be useful to track an individual's movement during the activity or to identify biometric data.

BRIEF DESCRIPTION OF THE DRAWINGS

Certain features of the subject technology are set forth in the appended claims. However, for purpose of explanation, several implementations of the subject technology are set forth in the following figures.

FIGS. 5A-5F show example user interfaces related to route matching determinations, in accordance with one or more implementations.

FIG. 10 shows a flowchart for analyzing route traversals, in accordance with one or more implementations.

FIG. 12 shows a flowchart for providing progress indications, in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Users who engage in physical activities, such as walking, running, cycling, and the like, may frequently traverse the same route, such as a runner running along a certain route, a walker traversing a familiar path through a neighborhood, or a cyclist repeating the same cycling loop. Given that these routes may have varying degrees of elevation, obstacles (e.g., traffic lights), and/or other location/route specific challenges, comparing a user's progress along the route against a fixed pace may not be that informative and/or helpful.

In the subject system, clustering techniques can be applied to identify previous routes to which a current activity of a user can be compared, and against which a device can provide comparison metrics. For example, before or after a user initiates a trackable activity, such as a run along a route, the subject technology can identify applicable prior routes at or near the same location (e.g., a previously recorded route, a best route, etc.) to which the current trackable activity can be compared. The subject technology may then compare one or more of the prior routes to the current location and route while the current activity occurs. Location data points between both routes may be compared and matched, e.g., through one or more optimization techniques, and various comparison metrics can be generated from the route-matching determinations and displayed to the user. In this manner, the subject system allows user to compare their current performance against prior performances on the same route in real-time, e.g., as they are performing the activity. Various implementations discussed herein can provide memory-efficient, computationally-efficient, and low-latency implementations resulting in accurate comparisons and clustering.

Figure 1A:
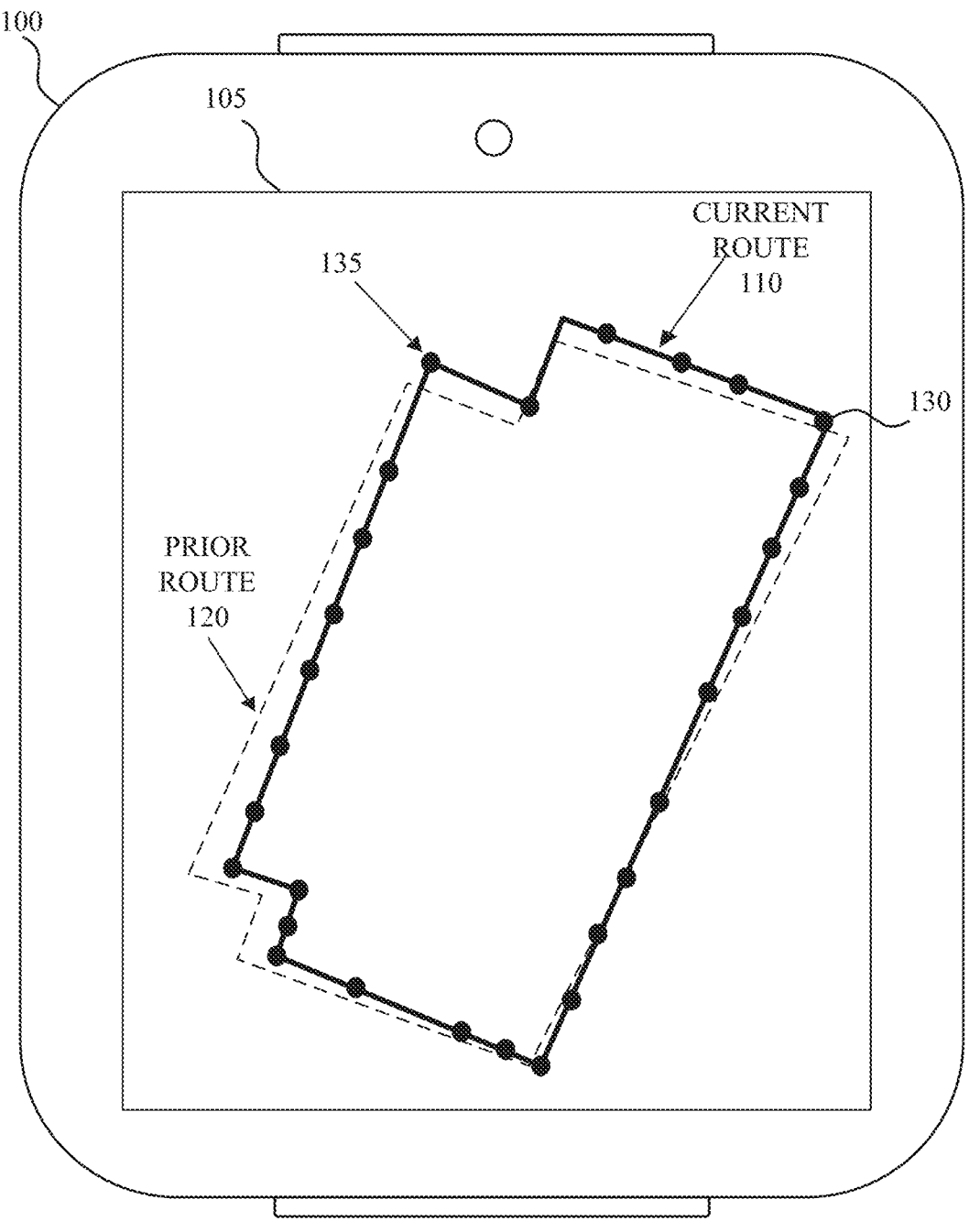
FIG. 1A shows an example of a mobile computing device displaying a path comparison between a current and previously-traversed route, in accordance with one or more implementations.

FIG. 1A illustrates a mobile computing device 100 displaying a real-time path comparison between a current route 110 and a previously-traversed route 120. A mobile computing device 100 may be a portable electronic device or a wearable electronic device and generate tracking data corresponding to movement of the mobile computing device over a period of time, such as during an event (e.g., an exercise session). The tracking data may be a collection of data points 135 along the course of a route of movements of the device (e.g., routes 110, 120), such as data points generated using one or more navigation systems, GPS data, and the like, while the mobile computing device 100 moves along a route. Further, tracking data can be saved in one or more files that list one or more sequential coordinates in, for example, two-dimensional (2-D) or three-dimensional (3-D) space, such as latitude, longitude, and altitude. Tracking data can be processed to obtain a path or route traversed by a device and/or a user of the device during the event, e.g., by joining together the tracked data points.

A user interface 105 displayed by the mobile computing device 100 may provide tracking at a starting position 130. Tracking and comparison operations may be initiated, for example, upon a selection of an activity at the user interface 105, and/or automatically, such as when a starting location at a selected route is reached, and the like. A user can initiate an activity tracking app, select a type of activity, select a previously recorded activity for comparison, and initiate activity tracking. Various implementations of the subject technology can identify a prior route 120 determined to be nearest to a current location of the device, and/or most similar to the current route 110 and/or most likely to be the same route as the current route being traversed.

Route identification and matching techniques, as discussed herein, can enable individuals to quantify their activity, and compare a current activity to a prior one. For example, runners, walkers, and cyclists may repeatedly traverse the same trail, path, or route throughout a park, city, or neighborhood. The subject technology can provide a historic record of performances along the prior route and provide pacing, for example, against a last activity, an average of several activities along the route, or a best time along a route. Enabling comparisons against previous performance may provide increased motivation and information to users and allow them to better track their fitness and performance levels.

In various implementations, the subject technology can provide users with the ability to select a certain activity, provide users with the ability to select previously stored route, provide directions along the route (e.g., how to return to the route if they get lost or otherwise leave the route), and provide users with guidance as to their pacing and/or performance against a previously recorded activity along the same route. In other aspects, the present technology can allow new routes to be recorded, and can make such determinations, even when a current route partially matches a previously recorded route.

It will be appreciated that in various implementations, the subject technology may interact with one or more apps, application programming interfaces (APIs), and systems, either local or remote, to provide the activity data and route information to other services.

Figure 1B:
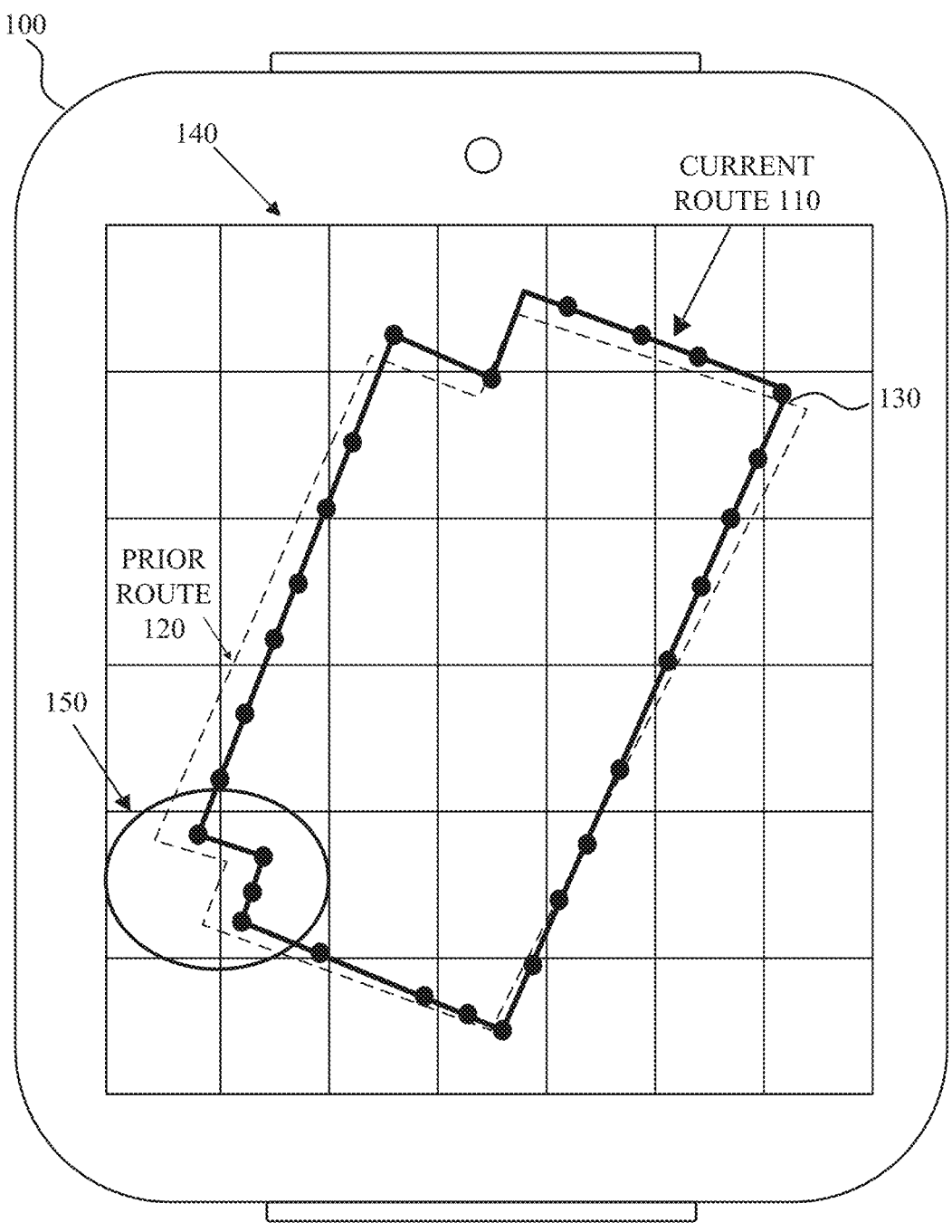
FIG. 1B shows an example clustering technique for path comparisons, in accordance with one or more implementations.

FIG. 1B illustrates a path comparison between the routes of FIG. 1A, with the current route and prior route overlaid on a grid 140 for comparison operations during the current activity. In such implementations, each location along the current route 110 may be compared with one or more data points (e.g., locations) along the prior route 120. In one or more implementations, the comparison of each current location (e.g., data points 135) with the prior route 120 may be analyzed with respect to a grid 140, which allows segments of the route to be analyzed for matching and comparison purposes. In examples, the subject technology can identify a current location and at least one applicable route. When the mobile computing device traverses a route, the current location traverses grid cells defined based on the prior route 120. For example, the prior route may be mapped onto a grid, e.g., N×N matrix. Each grid cell can cover an even amount of area. As such, grid cell sizes and area coverage may change depending on the size of the route. As the current location moves into a grid cell, any applicable data points for the previously traversed route in that cell (e.g., nearest data points), may be compared to a data point corresponding to the current location along the current route. In various implementations, the grid 140 may be a 2D matrix. In other implementations, a 3D matrix can be used, for example, to include altitude/elevation measurements for current and prior routes.

In various implementations, the subject technology can utilize one or more applications and data sets to identify applicable clusters of routes that may be applicable to a current or anticipated route. For example, previously recorded route data may be received from local storage at a mobile device and/or from a storage device in communication with the mobile device, and one or more clustering techniques may be applied to group the previously recorded routes and activities. Route clusters can be saved locally and/or remotely and revisited periodically, for updates and changes. In various examples the periodic revisits can occur after a period of time, e.g., days or weeks, and/or when an event occurs, e.g., when one or more new activities and/or routes are added. Contextual information can optionally be associated with clusters, including but not limited to a relevance score, a label, and/or a map snapshot.

During route clustering, recorded routes may be matched based on one or more data points. Data points can be matched to one another based on a location of the data point, and for example, whether data points are within a radius or margin of error of each other. In various examples, data points between routes can be compared to generate a relevance score, such as a match probability. The relevance score, e.g., match probability, may be based, at least in part, on a number of overlapping data points. An overlapping grid point may be based, for example, on a substantial location match, e.g., within a common grid cell, within a grouping of grid cells, GPS data, and the like. In other examples, the relevance score, e.g., match probability may be based, at least in part, on an overlap of a path connecting the one or more data points in each recorded route. Other factors for relevance score determinations can include one or more of a proximity of a cluster to a location (e.g., a user location), a recency of a recorded activity in a cluster, and a frequency of an activity within a cluster.

As illustrated in FIG. 1B, traversals of the same route may not overlap exactly. In one or more implementations, clustering techniques (e.g., as discussed in further detail herein in connection with FIG. 9) can also account for noise in the data that may indicate a divergence between routes. In the data points captured in region 150, route 110 and route 120 do not perfectly align. During activities, a plurality of reasons could account for the divergence, including but not limited to low, variable, and/or affected GPS signals, a route traversal on an opposite side of a road or sidewalk, and other location estimation issues. As such, since not all divergences indicate that the mobile computing device is not traversing a same route, a margin of error (e.g., an 85%, 90%, 95% or greater match) other distance threshold can be applied to group together similar data points. In the example of FIGS. 1A and 1, although routes 110, 120 do not perfectly align, they may be considered to be the same route for the various comparison aspects and features discussed herein. As such, aspects of the subject technology can accommodate noise and slight variation in the data.

Figure 2:
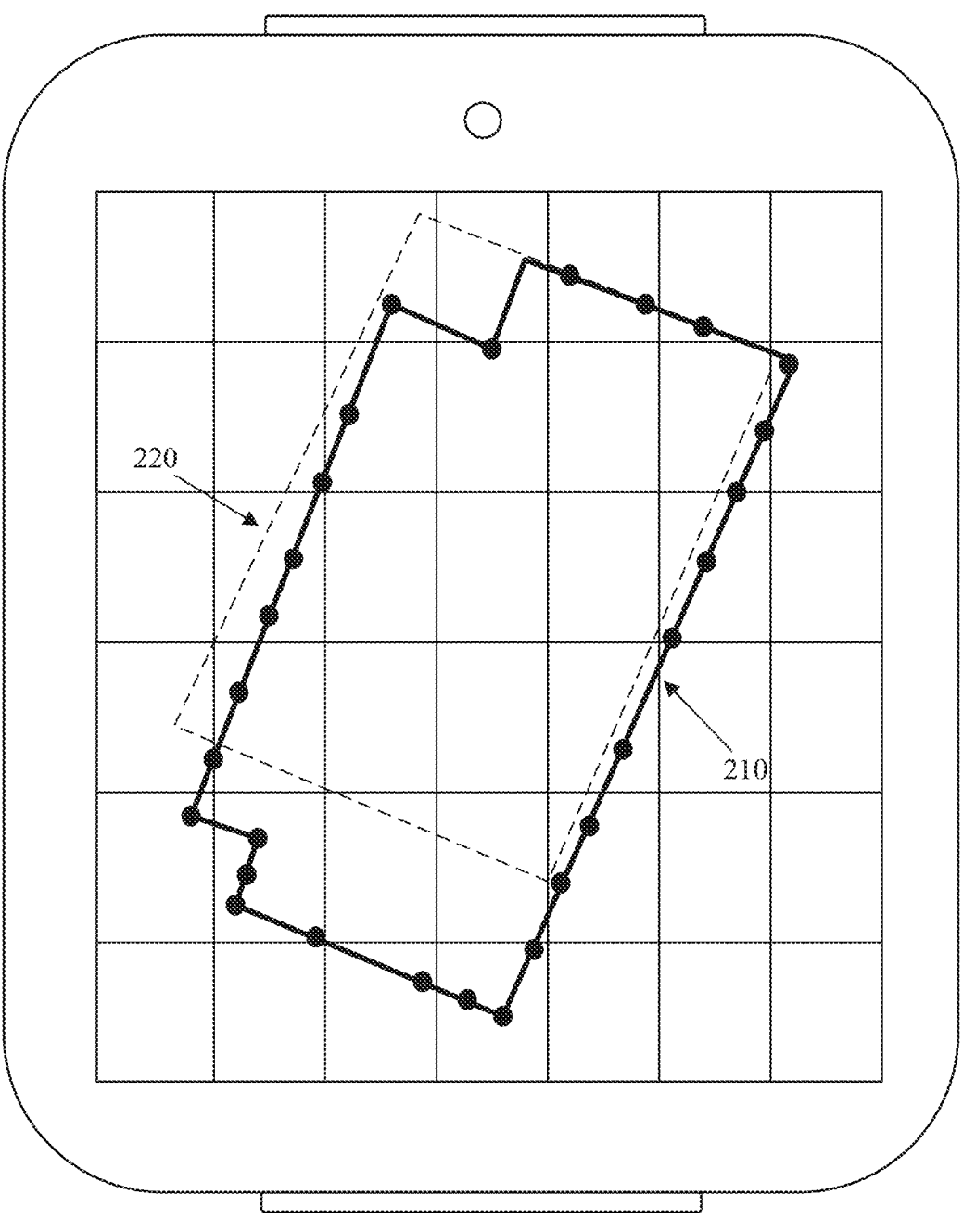
FIG. 2 shows an example route matching determination, in accordance with one or more implementations.

However, as illustrated in FIG. 2, if a first route 210 significantly diverges from a second route 220, a determination may be made that the first route 210 and second route 220 do not match. The non-matching determination can occur when the user diverges from the prior route 220 by a threshold distance. In other examples, the non-matching determination can occur if a percentage of matching data points and/or path data are below a threshold amount, e.g., 80% matching.

In some examples, a divergence can occur during a traversal of selected prior route, and may be identified if, for example, a radius around a current location data point does not align with or otherwise match a data point of the prior route by a predetermined distance or margin of error.

In various implementations, the grid overlay can be applicable and useful to determine divergence during a current activity, such as if a current location of the tracked mobile computing device goes off the grid or is located in a grid cell without any data points from the prior route to which the current location is being compared. In examples where the tracked mobile computing device exits the grid, or otherwise diverges from the prior route greater than a margin of error (e.g., for longer than a threshold amount of time without returning to the prior route), then a new route can be generated. In some implementations, as discussed herein, a change or divergence in route can prompt a new clustering search and determination for a matching route after the current route is completed.

Figure 3:
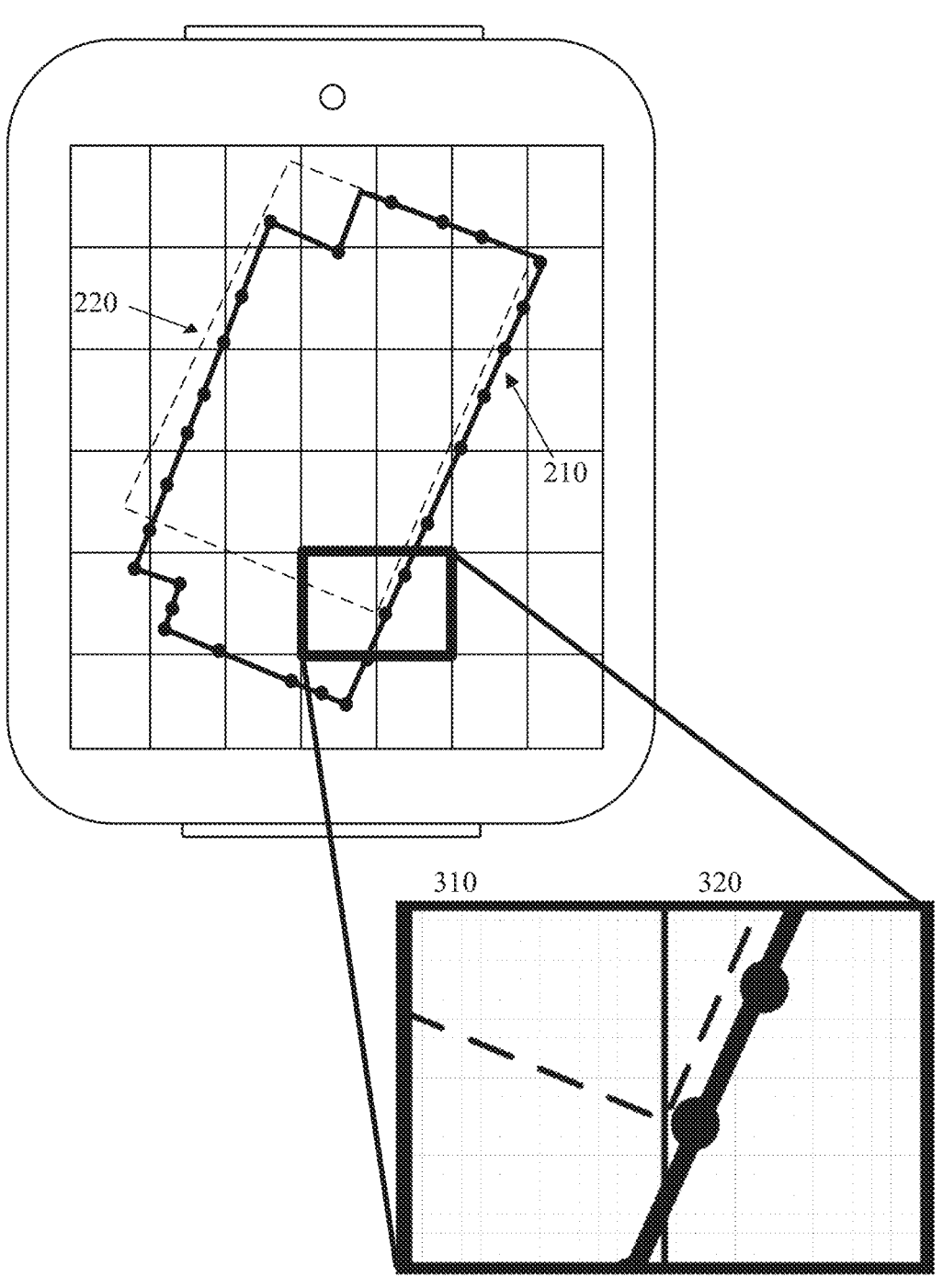
FIG. 3 shows another example route matching determination, in accordance with one or more implementations.

In one or more implementations, the use of grid cells can increase the efficiency of real-time comparison to a prior route, such as by limiting the number of data points from the prior route to which the current location is to be compared at any given time during the current activity. As illustrated in FIG. 3, individual grid cells may also be utilized to indicate a divergence in routes. In the example of FIG. 3, individual grid cells 310, 320 respectively indicate a divergence determination and matching determination. In grid cell 320, route 210 and route 220 are very close and may be within a threshold distance or margin of error, as defined by the particular settings and preferences. However, grid cell 310 shows a visible divergence between route 210 and route 220. For example, while the current location along the route 220 is within the grid cell 310, there may be no data points within that grid cell with which to compare the current location. While the current location is within the grid cell 310, the distance between the two routes may be quantified, e.g., by a processor associated with the mobile computing device, and when the distance is determined to be outside of the threshold range or margin of error, the current route can be determined to diverge from the prior route to which the current location is being compared during the current activity.

In various implementations, comparison data over time, across a plurality of grid cells, may be used to identify trends and matching determinations. In one or more implementations, if a current location is determined to be away from the prior route to which the current location is being compared for longer than a threshold amount of time, the real-time comparison with the prior route may be ended.

In various implementations, in order to identify prior routes to which current activities can be compared, clustering techniques described herein may be used to sort a plurality of routes associated with one or more characteristics, such as an activity type, a starting location, and the like. Further clustering techniques can include application of one or more pre-filters to all applicable routes and dynamic time warping, as discussed herein, and at least with respect to FIGS. 9 and 11.

Figure 4:
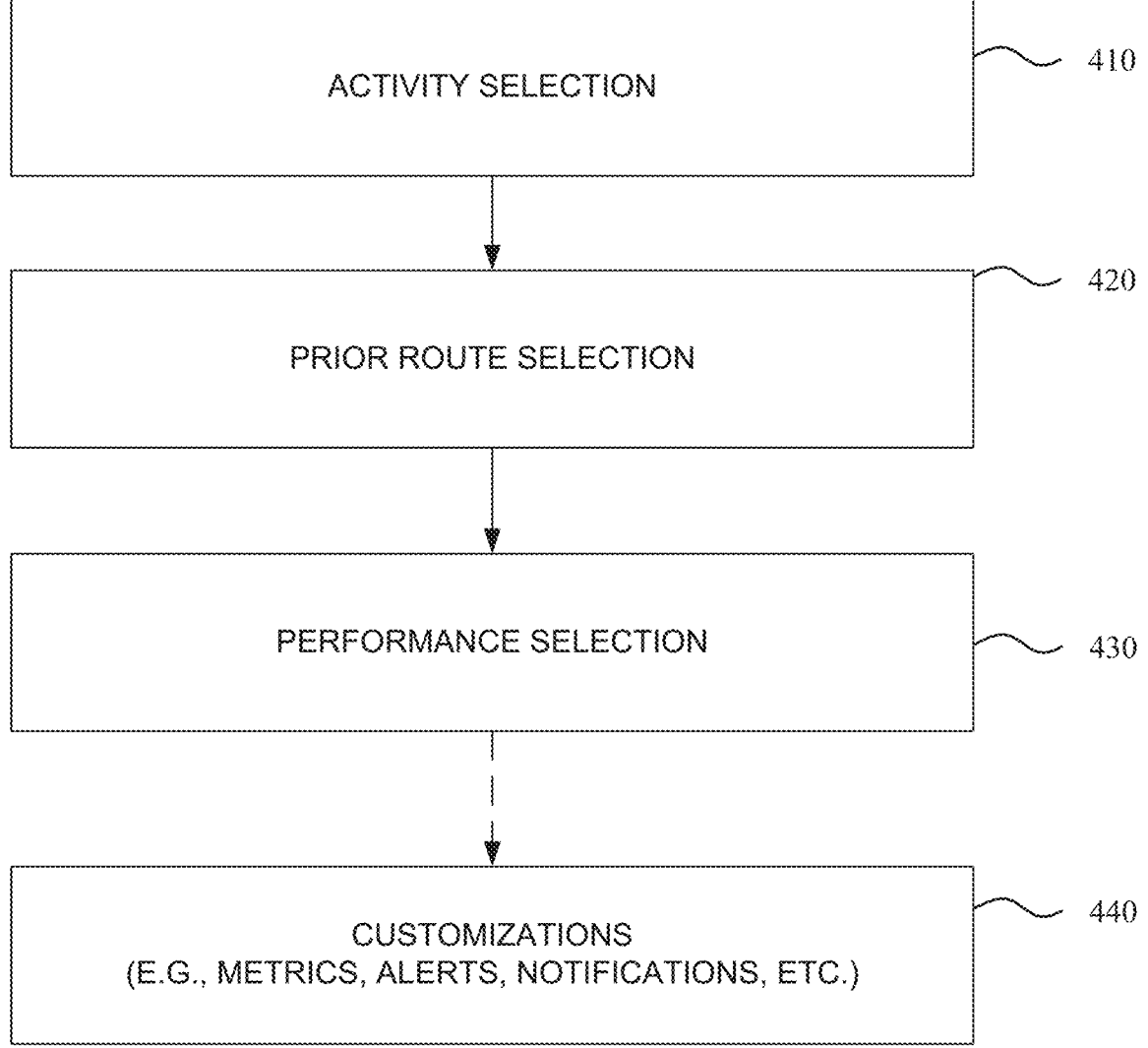
FIG. 4 shows an example flowchart for operational selections, in accordance with one or more implementations.

FIG. 4 illustrates an operational flow chart for route comparisons, in accordance with various implementations. A mobile computing device 100, such as a wearable device, fitness tracker, and the like can include a display and a user interface for receiving selections. The mobile computing device 100 may include one or more biometric sensors for capturing and/or measuring biometric data of the user during the activity, such as heart rate, blood-oxygen level, and the like. The mobile computing device may receive an activity selection 410, corresponding to a type of activity, such as a physical activity or exercise. In various implementations, the activity selection 410 may be a run, walk, cycle, or other trackable activity.

Upon selection of an activity or workout 410, a prior route selection 420 may be provided on the user interface. In examples, the prior route selection can include one or more most recent activities, or at least one activity corresponding to a particular location, e.g., a present location of the mobile computing device. The prior route selection may present a group of prior routes that were identified using the clustering techniques described herein at or near a current location.

In a non-limiting example, if "Run" is selected as the activity, the prior route selection interface may show the past several runs recorded on the mobile computing device (e.g., at or near the current location) and/or associated with a user account on the mobile device. The past several runs may be for a same location and route or list different routes. The past several activities, i.e., runs in this example, displayed on the user interface may indicate activities occurring with a certain time period, e.g., the previous day, two days, week, month, etc., or list all recorded activities corresponding to the selected activity.

After the prior route selection 420 occurs, a performance selection 430 may be presented on the user interface. A performance selection 430 relates to the type of comparison to be performed during the activity and can include but is not limited to comparison to a personal record, and average, and a most recent selection. For a "Personal Record" performance selection, the mobile computing device can track the current activity's traversal along a route relative a best time, e.g., personal record, associated with the route. As such, when the mobile computing device traverses the route, the location of the mobile computing device will be compared to the prior route associated with a personal record, e.g., a fastest time, pace, etc.

A performance selection related to the "Average" selection provides an average of all previously recorded routes corresponding to the selected activity and selected average route will be compared, in real-time, against the current route traversal. In an example, if a user has five previously stored runs along a certain route, the "Average" selection can take the average time, pace, location, and/or other movement metrics for that running route and generate an Average route against which the current route may be compared.

A performance selection related to a "Most Recent" selection provides the most recent activity relating to the selected route and activity. For example, a user may be interested in comparing their last walk along a path to their current walk along the same path. In this case, the Most Recent selection identifies the most recent activity corresponding to a walking activity along the selected path, and the user's movement along the path, as recorded by the mobile computing device, can be compared to the most recent prior activity.

In various implementations, one or more customizations 440 can be optionally applied to route comparison selections. For example, the route comparison can further specify one or more metrics, alerts, and notifications to be measured and/or provided during a current traversal along a route. For example, during an activity, a user may want to receive notifications related to speed, pace, or time. Notifications can include alerts, sound, vibrations, haptic feedback, visual notifications, and push notifications related to a current progress along a route.

For example, audio notifications can be provided at certain time intervals to notify a user of their current speed, pace, or time, and/or a current speed, pace, or time relative to the prior route. Such notifications can allow users to identify and compare their current activity performance to the prior route. In some examples, as discussed herein, a notification can be provided if a user is traversing a route faster or slower than the prior route, according to a predetermined, time, pace, or speed.

Notifications and alerts can also be optionally set up to notify a user when the current route is diverging from the prior route, e.g., when a wrong turn has been taken. Such notifications can instruct the user how to return to the route, offer route guidance, and request input regarding whether a new route should be recorded. It will be appreciated that the implementation of these activity, route, and performance selections and customizations are not limited to the examples discussed herein, and the order in which the activity, route, performance, and customizations selections are received by the mobile computing device need not be performed in the specific manner and order discussed herein.

FIGS. 5A-F illustrate example user interfaces related to route matching determinations, in accordance with one or more implementations. FIG. 5A illustrates an example user interface in which a route selection may be received. A user can select a route, in accordance with implementations discussed herein, for comparison with a current activity. Upon selection, a user can start the activity, and can race against the previously recorded route. In implementations, the user interface may display Routes A, B, . . . , n, indicative of a list of most recent routes. Other route categorizations may be possible, based on user preferences, for example, and may be grouped based one or more route characteristics, such as location, distance, activity type and the like. For example, the Routes A, B, . . . , n may be routes that include locations at or near a current location of the device displaying the user interface.

FIGS. 5B and 5C illustrate an example user interface providing route guidance. Such guidance can occur, for example, when a user is traveling along a route and/or when a user diverges from the route. In various implementations, the route guidance interface can provide continuous guidance, e.g., providing one or more sounds, alerts, or notifications, at various turns or points along the route. In other implementations, the route guidance features can be initiated prior to the start of the route tracking activity, for example, directing the user to the start location of the route to be tracked and raced against. Similarly, as illustrated in FIG. 5C, route guidance can be provided when a user goes off route, such as when a user takes a wrong turn. In either scenario, the route guidance can provide at least one of a direction and a distance to the route.

FIGS. 5D and 5E illustrate user interface notifications including a time/distance ahead (FIG. 5D) and time distance behind (5E) the raced (prior) route. It will be appreciated that the pacing metric is not necessarily limited to time and distance, and any of a plurality of pacing metrics can be utilized to notify a user of their position along the route, relative to the compared route. In such implementations, a distance remaining on the route can also be provided on the user interface, and communicated, audibly, visually, and through one or more notification and alert styles.

FIG. 5F illustrates a route completion screen, which may provide one or more route metrics, relating to either or both of the current route, and comparison metrics between the current route and the previously stored, raced route. Route metrics can include at least one of time, pace, speed, and distance, measurements, as well as relative performance compared to the prior route. It will be appreciated that the user interfaces in FIGS. 5A-F are exemplary, and it should be appreciated that any of a variety of performance metrics, and route data may be provided visually, e.g., through the user interface and/or with one or more alerts or notifications.

Figure 6:
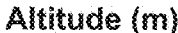
FIG. 6 shows example altitude and average pace data for an activity, in accordance with one or more implementations.
Figure 7:
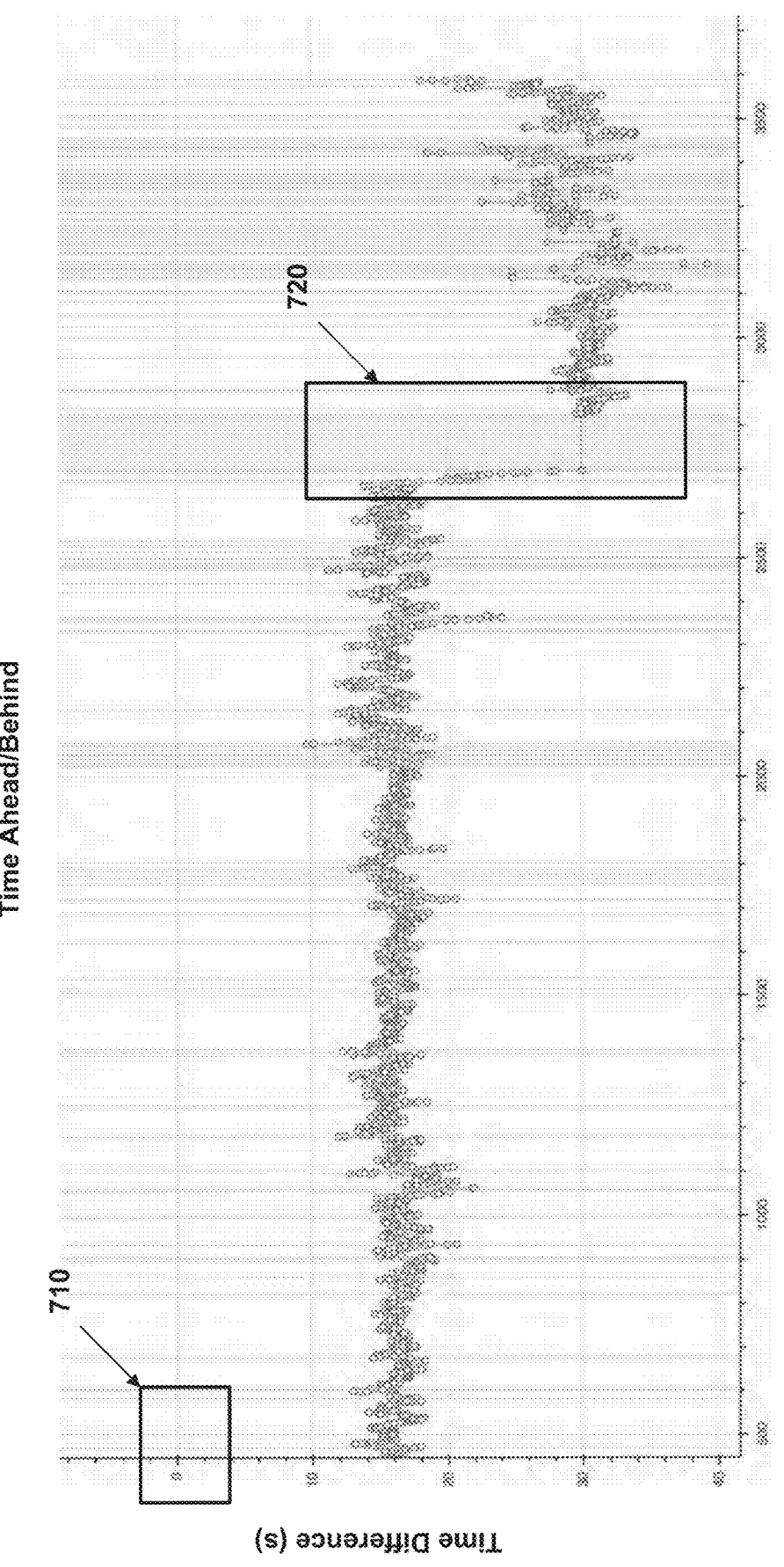
FIG. 7 shows example time data compared to a previously recorded activity, in accordance with one or more implementations.
Figure 8:
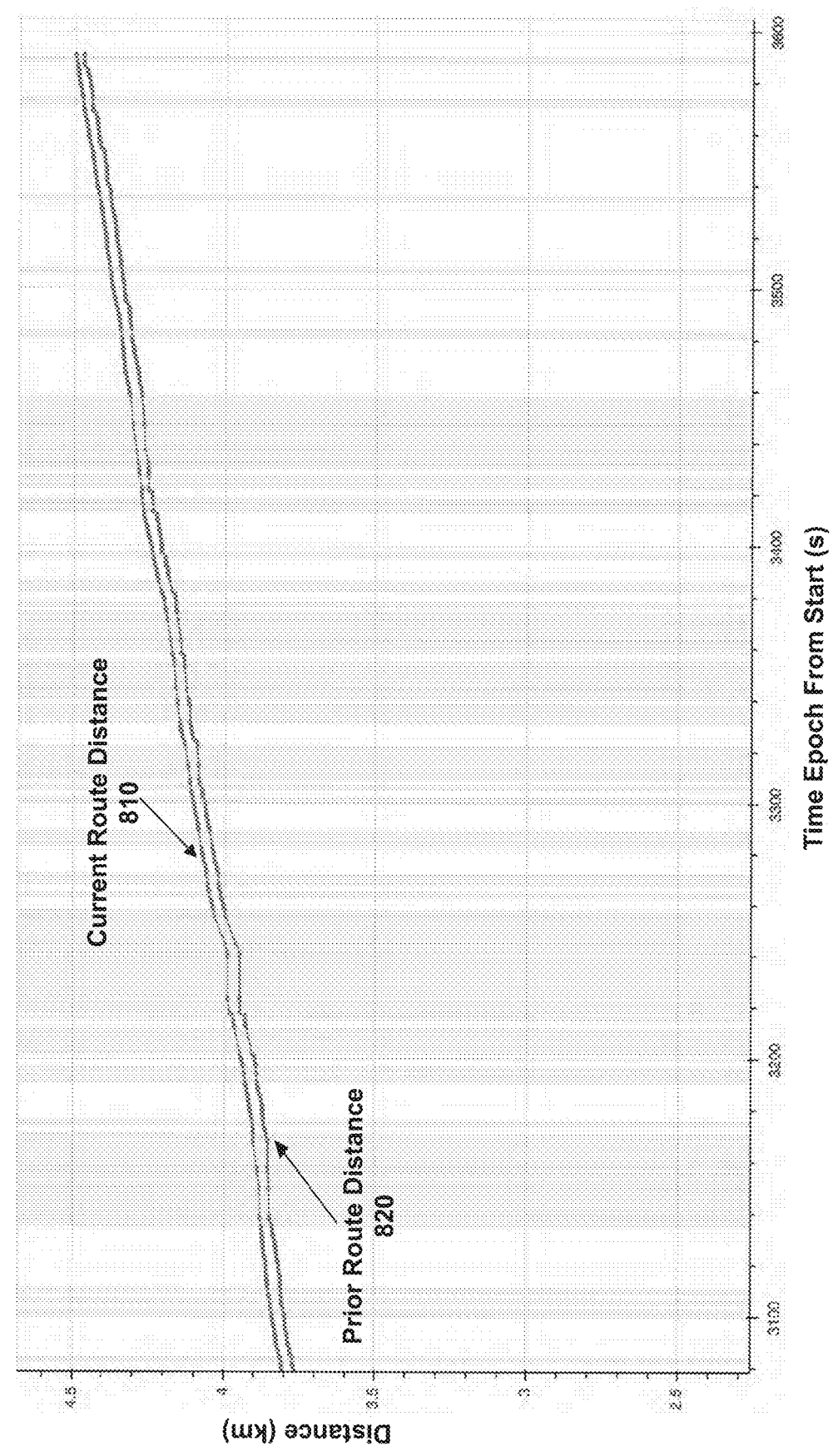
FIG. 8 shows example distance data compared to a previously recorded activity, in accordance with one or more implementations.

FIGS. 6-8 illustrate graphical representations of a plurality of route performance metrics, for current route comparisons against prior routes. FIG. 6 illustrates altitude and average pace data for an activity, in accordance with one or more implementations. When a current route is being compared to a prior route, altitude data 610 and current average pace data 620 can be tracked and measured against prior performances.

Likewise, such collected data can be applicable in one or more clustering techniques, as discussed herein, to identify similar routes for comparison. Performance metrics between two routes can be compared based on altitude and average pace. For example, it is reasonable that average pace may decrease as altitude increases, as an altitude increase may be indicative of an individual moving uphill or performing an activity at elevation. An increase in average pace for a traversal of a same route can be indicative of an improvement in fitness or performance. Likewise, altitude and pace data for a given route can be used to match similar activities.

FIG. 7 illustrates time data compared to a previously recorded activity, in accordance with one or more implementations. The time ahead/behind graph measures a current pace relative to a baseline 710, which may be a pace of prior route or an average pace of prior routes, for example. A time difference at the baseline 710, i.e., 0 seconds, can indicate that a user is moving at the same speed as the tracked movement in the prior route. A positive number above the baseline, i.e., representing a time difference ahead of the 0 second baseline, indicates that a user is moving faster than the pacing in the prior route, and a negative number below the baseline, i.e., representing a time difference behind the 0 second baseline, indicates that a user is moving slower than the pacing in the prior route. As indicated by the values in region 720, the user, who had been moving along the route at a pace about 10-20 seconds behind the prior route, decreased their pacing to nearly 30 seconds behind the prior route, and sustained the pace throughout most of the remaining portion of the activity. The metrics identified in FIG. 7 may be directly applicable to the route guidance features discussed herein (see e.g., FIGS. 5D, 5E).

FIG. 8 illustrates distance data compared to a previously recorded activity, in accordance with one or more implementations. The distance data provides a comparison of a current route distance 810 to a prior route distance 820. The prior route distance 820 can be a previously recorded route, such as a fastest route, last route, or average route, as discussed herein. The distance metrics can be usable for one or more notification, alerts, and user interfaces, as discussed in FIGS. 5A-F and provide a user with information regarding their current performance and traversal along the route. For example, the difference between current route 810 and prior route 820 for a given time illustrates a distance difference at the given time along the route. Differences in distance between routes 810, 820 over a time range can be usable for speed, distance, and other pacing comparisons.

Figure 9:
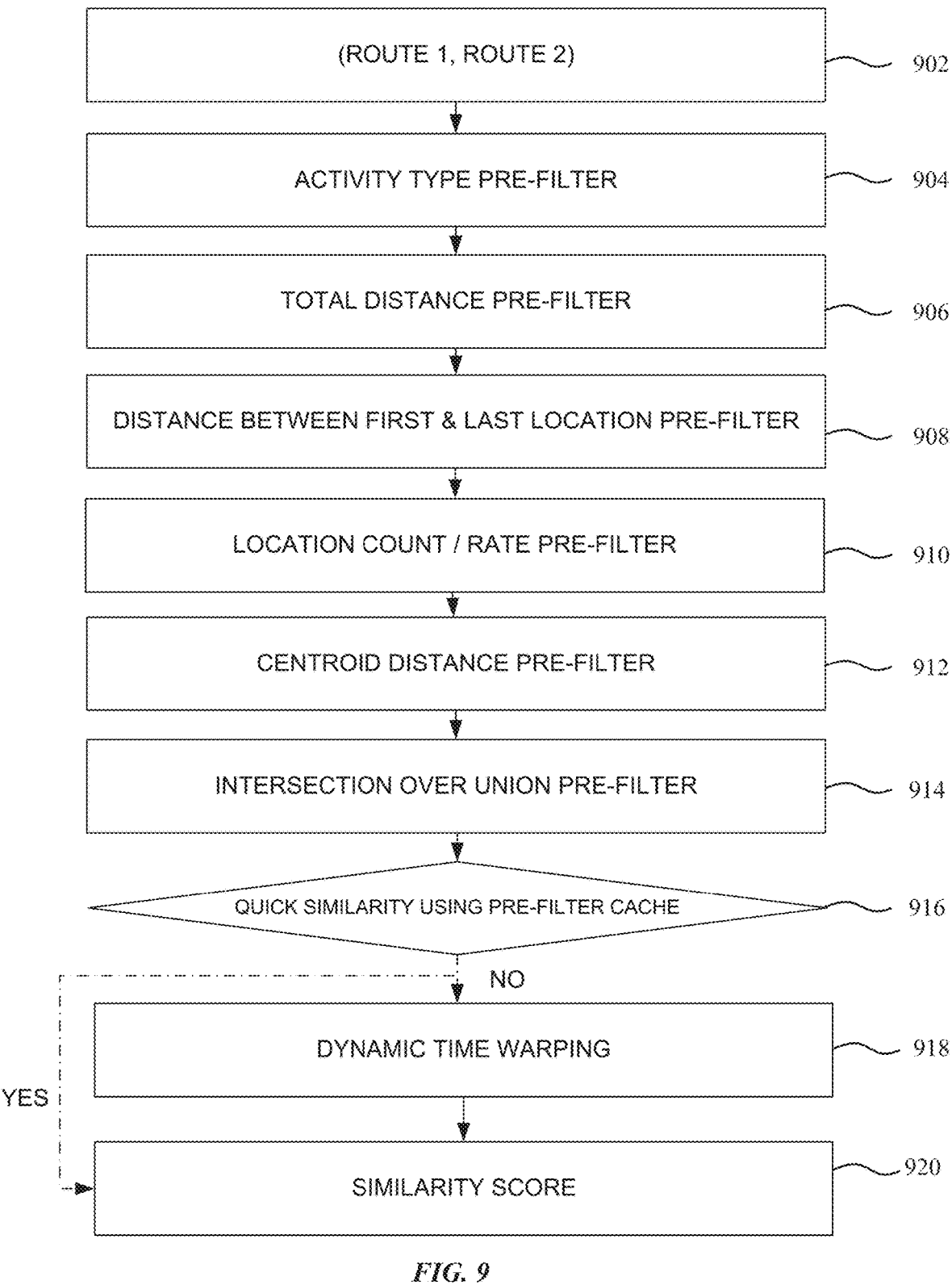
FIG. 9 shows a flowchart with pre-filtering techniques, in accordance with one or more implementations.

FIG. 9 illustrates aspects of a clustering technique for generating a set of previous routes based on a plurality of previously recorded routes. FIG. 9 illustrates a plurality of pre-filters that can be applied to a plurality of routes during the clustering determinations, and a dynamic time warping operation that can be applied to routes that pass the plurality of pre-filters. Dynamic time warping operations determine similarities between temporal sequences, and are applicable, even when the temporal sequences vary in speed and/or are non-linear. Dynamic time warping can determine matches between time series, based on one or more restrictions, such as cost minimization, optimization, and other sequence alignment algorithms, or example. As discussed herein, once a cluster of routes is identified (e.g., using the process of FIG. 9), each cluster of routes can include a route name, a best route, and/or a last route.

In one or more implementations, clustering operations can initiate a selection of at least two routes, (Route 1, Route 2) for comparison 902. The potentially matching routes may be identified based on one or more selections indicative of an activity type, a starting location, and ending location, a time spent performing the activity, and the like. In one or more implementations at least one pre-filter can be applied to determine whether clustering is appropriate for the routes.

An activity type pre-filter 904 can sort routes based on the activity associated with the route. For example, a walking activity, a biking activity, a running activity, a skateboarding activity, or other trackable activity, as discussed herein, may be associated with the activity type pre-filter. In this manner, only routes associated with similar activities will be examined for clustering. For example, a 400-meter walk around a track may occur along the same path, and at the same location as a 400-meter run/sprint along the same track, however the two activities typically would not be compared against each other and clustering the two activities may not necessarily be useful or beneficial for a user. As such, the activity type pre-filter may prevent these two activities from being clustered together, since they would be categorized as different activities (e.g., a walk and a run).

A total distance pre-filter 906 filters routes based on a total distance covered during the route. A plurality of running events for example, can be significantly narrowed based on a distance covered during the activity (e.g., <3 miles, 3-5 miles, 6-10 miles, 11+ miles, etc.). The total distance pre-filter helps eliminate activities that follow routes of significantly different lengths from being compared, including routes that follow a same route, but should not be compared. For example, the tracked route of a walker who walks a single time around a walking track would look like a route of a walker who does two or more laps around the same track. The distance pre-filter can prevent comparison between these two dissimilar activities.

A distance between first and last location pre-filter 908 analyzes the starting point of two activities. In one example, two routes traversed in two different cities hundreds of miles apart may have starting points that are hundreds of miles apart, which may indicate the two routes should not be compared. In another example, two 30-mile cycling routes may substantially follow the same path along a road but have different start locations that are 0.5 miles apart. Although the activities, distance, and route may appear similar, the two routes would not be appropriate for comparison or clustering. As such, the pre-filter 908 helps to further refine applicable routes for comparison.

A location count/rate pre-filter 910 analyzes location counts and/or a rate of location identification between routes. In one example, a location point can be identified at given time intervals (e.g., every 3, 5, 10 seconds, etc.) or at a given distance interval (e.g., 25, 50, 100 meters, etc.) Locations points can be compared between routes to determine a similarity and/or matches between the routes. A location count and/or location rate comparison between the two routes, e.g., for a given area, such as a grid cell, or over a period of time can provide insights regarding whether the routes are comparable.

The centroid distance pre-filter 912 may use an aggregate of data points of each route to determine a centroid position and compare a distance between two centroids of two routes. In such implementations, the centroid, e.g., center of a data points for a route, can be compared to the centroid of data points for another route. The relationship, e.g., distance, between the centroids can be defined depending on one or more preferences. That is, the centroid distance between two routes, for the routes to be considered matching for clustering purposes, can depend one or more considerations, such as a defined distance, sensitivity, margin of error and the like. In implementations, each route may be considered to be a polygon, and a distance between centroids can be determined based, e.g., on the distance between two mean vectors of the data points associated with each route. The smaller the centroid distances between routes, the more similar the routes. In implementations, if a centroid distance is within a certain threshold, the routes pass the centroid distance pre-filter.

The intersection over union pre-filter 914 may filter the routes based on a measurement relating to overlapping regions between the routes. Generally, intersection over union can be defined as an area of intersection divided by an area of union. As such, two routes may be compared based on the area of intersection and the areas of union for the paths defined by the plurality of data points. Such measurements enable two routes to be compared and assist in generating a similarity measurement between the routes. Like the centroid distance determination, if the intersection over union value is within a certain threshold measurement, e.g., 90%, the routes may pass the intersection over union pre-filter 914.

A quick similarity determination using a pre-filter cache 916 can initiate optional dynamic time warping operation(s) 918 or initiate a similarity score 920. The quick similarity operation 918 can determine whether there is a sufficient match between the routes such that a similarity score 920 can be determined. If there is a sufficient match, determinable by any of a plurality of matching operations discussed herein, including but not limited to overlapping data points, a plurality of matched points between routes, etc., then a similarity score 920 can be determined. The similarity score 920 represents a similarity between the routes, such as a percentage, ratio, relevance, and/or likelihood of a match between the routes. Any of a plurality of similarity determinations discussed herein, such as a relevance score, match percentage, and the like, can be applied, If there is not an adequate similarity determination using the pre-filter cache, dynamic time warping 918 can be applied, as discussed herein.

In various implementations, one or more pre-filters can require all locations of both routes (i.e., Route 1 and Route 2). For example, the location.

In one or more implementation, dynamic time warping 918 may be applied to routes that pass the pre-filters 904, 906, 908, 910, 912, and/or 914. Routes where a quick similarity is not identified and/or are not ideal can initiate dynamic time warping 918. Dynamic time warping 918 can be applied in clustering techniques discussed herein to measure similarity between two temporal sequences, such as temporal sequences (e.g., routes) which vary in speed. Dynamic time warping algorithms are applicable to time series data and assist in finding patterns between route data sets, and those with linear time complexities. For example, in a route comparison, a smallest distance between data points may be applied, and therefore allows comparisons of time series that are not exactly equal in length. As such, two activities, such as two walking activities along a same route, but at different speeds, can be compared to each other. Dynamic time warping assists in comparing similar activities and routes where pacing is different along the entire route and/or along various portions of the route. It will be appreciated that various implementations of dynamic time warping can be applied, as well as other matching algorithms, such as those utilizing Euclidean distance as a base metric, to identify and cluster similar routes. In one or more implementations, two prior routes that are sufficiently similar according to the dynamic time warping operation may be identified as two traversals of the same route. From among the prior routes that are identified as traversals of the same route, routes may be identified as a fastest route, a most recent route, etc. that can be selected by a user for comparison to a current activity (e.g., so that a user can race their prior fastest or most recent traversal of the selected route).

FIG. 10 illustrates a flowchart for analyzing route traversals, in accordance with implementations discussed herein. The blocks of process of FIG. 10 are described herein as occurring in serial, or linearly. However, multiple blocks of FIG. 10 may occur in parallel. In addition, the blocks of the process of FIG. 10 need not be performed in the order shown and/or one or more blocks of the process of FIG. 10 need not be performed and/or can be replaced by other operations.

In one or more implementations, at block 1010, a mobile computing device (e.g., the electronic device 1300 of FIG. 13) may provide (e.g., for display) a plurality of groupings of route traversals, e.g., routes that have been traversed by a mobile computing device. In various implementations, the plurality of groupings of route traversals can correspond to one or more characteristics, e.g., based on a current location of the mobile computing device at a first time. Each of the groupings can further correspond to a respective route and include at least one of a fastest traversal for the respective route or a most recent traversal for the respective route.

At block 1020, the mobile computing device may receive (e.g., from a user via an input component of the mobile computing device) a selection of one of the plurality of groupings. For example, the user may select the fastest route or the most recent route for comparison with a current activity about to be performed by the user.

At block 1030, the mobile computing device can further obtain, at a second time later than the first time, and during traversal of a current route by the mobile computing device, an updated location, e.g., of the mobile computing device.

At block 1040, the updated current location and the second time may be compared with at least one of the route traversals corresponding to the selected one of the plurality of groupings.

At block 1050, and based on the comparison, an indication of progress along the current route relative to the at least one of the route traversals of the selected one of the plurality of groupings for display during traversal of the current route, may be provided on the mobile computing device.

In a non-limiting example, for a new route comparison operation, a user can select a cluster of routes from a set of routes associated with a current or starting location. Once a cluster of routes are selected, a user may select at least one of a most recent activity, fastest, or average activity associated with the route. In one or more implementations, as discussed herein, the comparison at block 1040 may include obtaining a grid (e.g., matrix) that is based on the selected prior activity, the grid including an array of grid cells. For each current location along the current route (see, e.g., FIGS. 1-3), the current location can be compared to previous route data points within that grid cell within which the current location falls, e.g., to find the nearest point- or an interpolated point that is nearest to the current location.

In various implementations, a maximum accepted distance between two points can be applied in determinations to find a nearest point. The maximum accepted distance between two points can be a function of an activity type and a signal environment. In an example, after finding a nearest data point, a projection of the current location can be calculated along the reference route. The information at the project point can be determined, for example, via interpolation.

In implementations, if multiple data points from the prior route are within a grid cell, a radius set to a predetermined size (e.g., 25-meters) can be used within which a search for nearest data point neighbors can be performed. In various implementations, the radius can change depending on a signal environment. For example, in areas with a weaker signal, the radius can be larger. In areas with strong signal, and therefore a more accurate location estimate, the radius can be smaller. In various examples, the size of the grid cells may be greater than the radius. In the data point comparisons of block 1040, only unvisited data points (e.g., points to which locations along the current route have not yet been associated during the comparison at block 1040) are compared to ensure that current and prior routes are being compared in the same direction.

In implementations, if there are no matching points within a grid cell during the comparison of block 1040, this may be indicative of a divergence between the current route and a prior route. One or more notifications may be provided via the user interface to identify that there is a diversion between the routes. In some implementations, nearby (e.g., adjacent) grid cells may be searched for potentially matching data points.

In one or more implementations, the identified nearest previous data points may be interpolated to find a time at which the mobile computing device was at a current location when traversing the previous route. A rolling window for comparisons can be applied as well. For example, sets of data from prior data can be received over time, e.g., in rolling windows, such that smaller portion of the data can be analyzed as the route progresses.

In various implementations, data can be processed in real-time, as the mobile computing device traverses a current route. Accordingly, sets of data can be requested and received when a current location and/or time approaches the end of the locations and/or times of a current set of data points. For example, a next set of data points can be received when a certain percentage, e.g., 70% of data points have been matched between the prior route and the current route. If matching data points between a current and prior route are no longer detected, a wait period (e.g., 10 seconds), can be applied before checking again for a match. If there are still no points detected, a notification regarding a deviation from the route may be provided. After a predetermined set of time, such as 2, 5, or 10 minutes after which no data point matches can be identified, race comparison features can be canceled, and the current route can be recorded and measured on its own.

The subject technology can further include detecting, after the current route has ended (e.g., at a later time), a new location of the mobile computing device and identifying a new set of groupings of routes based on the new location. For example, the mobile computing device may be worn for an activity in a different location, such as a new area of a state or in a different city or town, and a new set of routes at or near the new location can be identified and provided for selection by a user for comparison of an upcoming activity.

Figure 11:
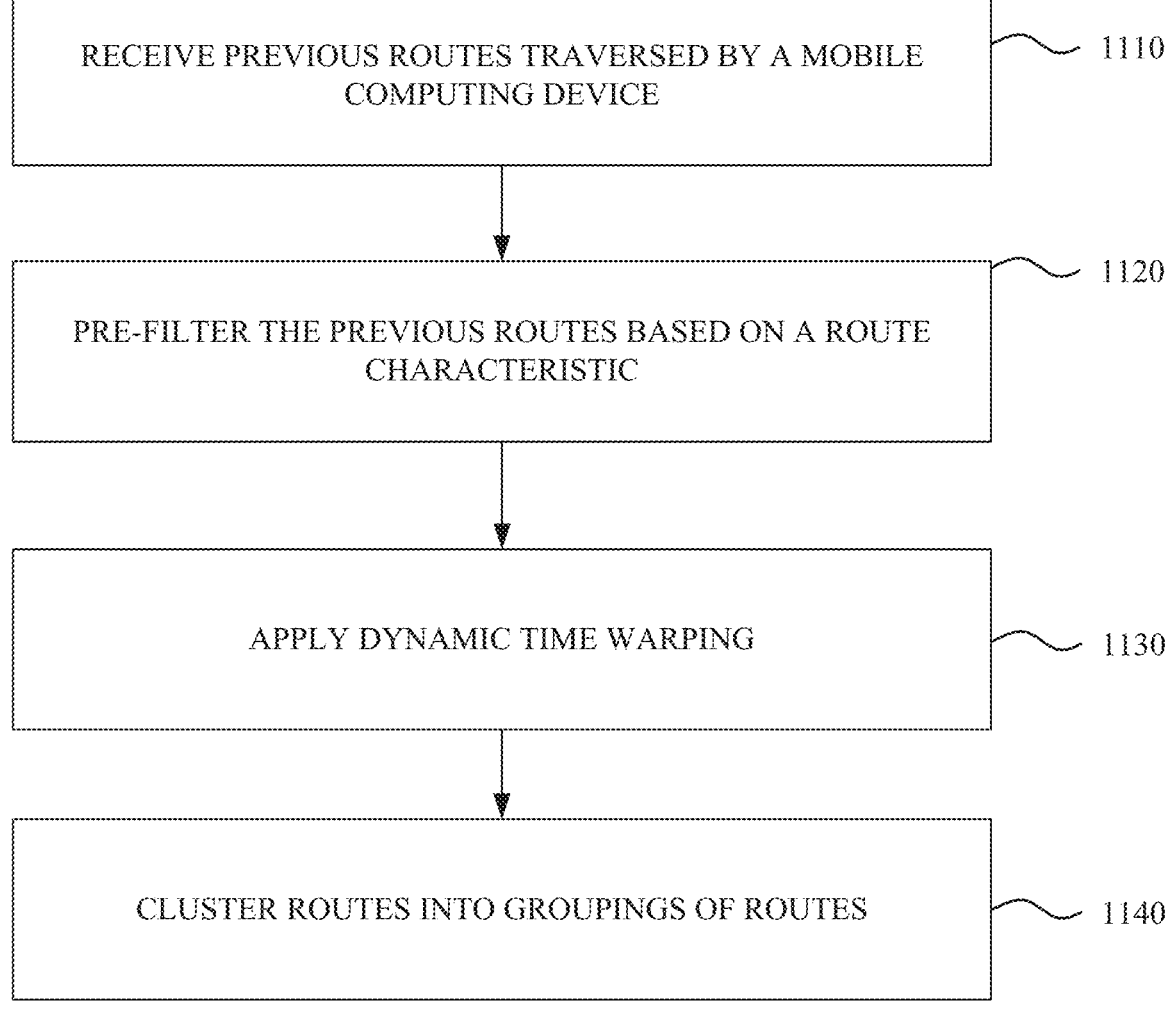
FIG. 11 shows a flowchart for an example clustering technique, in accordance with one or more implementations.

FIG. 11 illustrates a clustering technique for the plurality of prior routes, in accordance with implementations discussed herein. The blocks of process of FIG. 11 are described herein as occurring in serial, or linearly. However, multiple blocks of FIG. 11 may occur in parallel. In addition, the blocks of the process of FIG. 11 need not be performed in the order shown and/or one or more blocks of the process of FIG. 11 need not be performed and/or can be replaced by other operations.

In various implementations, at block 1110, multiple previous routes that have been traversed by a mobile computing device may be received (e.g., at a cloud server associated with an account of a user of the mobile computing device). At block 1120, the multiple previous routes may be pre-filtered based on a route characteristic. For example, the pre-filtering of block 1120 may include any or all of the pre-filtering operations 904, 906, 908, 910, 912, and 914 discussed herein in connection with FIG. 9.

At block 1130, dynamic time warping may be applied to the filtered previous routes to cluster routes into groupings of routes 1140. For example, the dynamic time warping may include the dynamic time warping 916 of FIG. 9. In various implementations, the pre-filters of block 1120 can include at least one of: an activity type pre-filter, a total distance pre-filter, a distance between a first and last location pre-filter, a centroid distance pre-filter, or an intersection over union pre-filter.

FIG. 12 illustrates a flowchart for providing progress indications, in accordance with implementations. The blocks of process of FIG. 12 are described herein as occurring in serial, or linearly. However, multiple blocks of FIG. 12 may occur in parallel. In addition, the blocks of the process of FIG. 12 need not be performed in the order shown and/or one or more blocks of the process of FIG. 12 need not be performed and/or can be replaced by other operations.

Aspects of the subject technology may further include systems, methods, and devices for, at block 1202, obtaining, by a mobile computing device, a previously stored route traversed by the mobile computing device or another mobile computing device. At block 1204, the mobile computing device can identify an array of geographic cells encompassing the previously stored route. At block 1206, the mobile computing device may obtain a current location of the mobile computing device and a current time.

At block 1208, the mobile computing device may further determine whether the current location is within any of the geographic cells. At block 1210, responsive to a determination that the current location is within one of the geographic cells, the mobile computing device may identify a location along the previously stored route that is proximal to the current location based at least in part on the identified one of the geographic cells.

At block 1212, the current time can be compared with a time associated with the identified location along the previously stored route. At block 1214, the mobile computing device can display, based on the comparing, an indication of progress along a current route relative to progress along the previously recorded route (e.g., as discussed herein in connection with FIGS. 5B-5F).

In various implementations, comparing at block 1212 may further include comparing the identified location to data points, along the previously stored route, within a radius of the identified location. Data points may include one or more unvisited points not yet associated with the identified location or current route. In one or more implementations, comparing at block 1212 may further include interpolating at least two nearest data points to identify a time associated with the data points along the previously stored route. For example, an interpolated location between two locations along the prior route may be determined to be the closest location along the prior route to the current location, and an interpolated time between the two times associated with the two locations can be identified as a prior time with which the current time can be compared, to determine whether the current route is being traversed faster or slower than the prior traversal of the route.

In one or more implementations, obtaining the previously stored route at block 1202 may include obtaining a first subset of data points for the previously stored route, and obtaining a second subset of data points for the previously stored route when a predetermined number of data points in the first subset have been visited. In one or more implementations, the mobile computing device may identify a deviation from the previously stored route and provide an indication of the deviation for display by the mobile computing device (e.g., as described herein in connection with FIG. 5C). In one or more implementations, the mobile computing device may report at least one of an expiration or a cancellation of progress along the current route, after a predetermined amount of time away from the previously recorded route.

Moreover, one or more implementations may include comparing the identified location to data points, along the previously stored route, based on at least one of: a distance along the previously stored route, a time ahead of the previously stored route, a time behind the previously stored route, an altitude, and an average pace. In one or more implementations, the mobile computing device the indication of progress may include at least one of: an estimated time of completion, an indication of a current position along the route, a direction toward the route, a remaining time for completion, or a remaining distance for completion.

Figure 13:
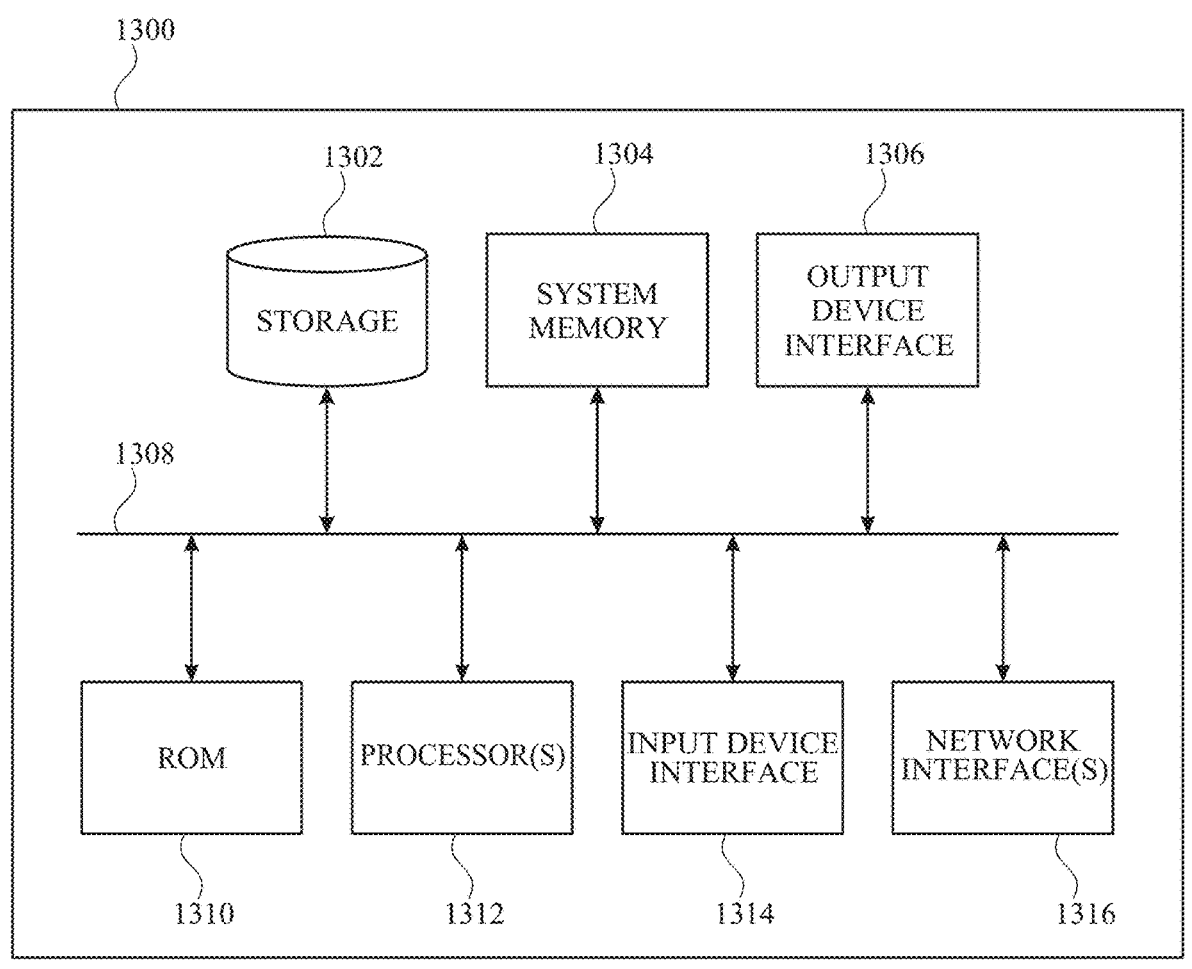
FIG. 13 illustrates an electronic system with which one or more implementations of the subject technology may be implemented.

FIG. 13 illustrates an electronic system 1300 with which one or more implementations of the subject technology may be implemented. The electronic system 1300 may include various types of computer readable media and interfaces for various other types of computer readable media. The electronic system 1300 includes a bus 1308, one or more processing unit(s) 1312, a system memory 1304 (and/or buffer), a ROM 1310, a permanent storage device 1302, an input device interface 1314, an output device interface 1306, and one or more network interfaces 1316, or subsets and variations thereof.

The bus 1308 collectively represents all system, peripheral, and chipset buses that communicatively connect the numerous internal devices of the electronic system 1300. In one or more implementations, the bus 1308 communicatively connects the one or more processing unit(s) 1312 with the ROM 1310, the system memory 1304, and the permanent storage device 1302. From these various memory units, the one or more processing unit(s) 1312 retrieves instructions to execute and data to process in order to execute the processes of the subject disclosure. The one or more processing unit(s) 1312 can be a single processor or a multi-core processor in different implementations.

The ROM 1310 stores static data and instructions that are needed by the one or more processing unit(s) 1312 and other modules of the electronic system 1300. The permanent storage device 1302, on the other hand, may be a read-and-write memory device. The permanent storage device 1302 may be a non-volatile memory unit that stores instructions and data even when the electronic system 1300 is off. In one or more implementations, a mass-storage device (such as a magnetic or optical disk and its corresponding disk drive) may be used as the permanent storage device 1302.

In one or more implementations, a removable storage device (such as a floppy disk, flash drive, and its corresponding disk drive) may be used as the permanent storage device 1302. Like the permanent storage device 1302, the system memory 1304 may be a read-and-write memory device. However, unlike the permanent storage device 1302, the system memory 1304 may be a volatile read-and-write memory, such as random access memory. The system memory 1304 may store any of the instructions and data that one or more processing unit(s) 1312 may need at runtime. In one or more implementations, the processes of the subject disclosure are stored in the system memory 1304, the permanent storage device 1302, and/or the ROM 1310. From these various memory units, the one or more processing unit(s) 1312 retrieves instructions to execute and data to process in order to execute the processes of one or more implementations.

The bus 1308 also connects to the input and output device interfaces 1314 and 1306. The input device interface 1314 enables a user to communicate information and select commands to the electronic system 1300. Input devices that may be used with the input device interface 1314 may include, for example, alphanumeric keyboards and pointing devices (also called "cursor control devices"). The output device interface 1306 may enable, for example, the display of images generated by electronic system 1300. Output devices that may be used with the output device interface 1306 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 13, the bus 1308 also couples the electronic system 1300 to one or more networks and/or to one or more network nodes through the one or more network interface(s) 1316. In this manner, the electronic system 1300 can be a part of a network of computers (such as a LAN, a wide area network ("WAN"), or an Intranet), or a network of networks, such as the Internet. Any or all components of the electronic system 1300 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an implementation, the implementation, another implementation, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any implementation described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. § 112, (f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   clustering a plurality of route traversals that have been traversed by a mobile computing device into a plurality of groupings of route traversals, the clustering comprising:
   receiving the plurality of route traversals that have been traversed by the mobile computing device;
   pre-filtering the plurality of route traversals based on a route characteristic; and
   applying time series matching to the filtered plurality of route traversals to cluster the plurality of route traversals into the plurality of groupings of route traversals,
   wherein each respective grouping includes respective route traversals that are within a threshold distance of each other and correspond to a respective route;
   displaying, based on a current location of the mobile computing device at a first time, a representation of a respective grouping of the plurality of groupings of route traversals, the respective grouping including at least one of a fastest traversal for the respective route or a most recent traversal for the respective route;
   receiving, by the mobile computing device, a selection of the displayed representation corresponding to one of the respective grouping of the plurality of groupings;
   obtaining, at a second time later than the first time and during traversal of a current route by the mobile computing device, an updated current location of the mobile computing device;
   comparing the updated current location and the second time with at least one of the route traversals of the selected one of the respective grouping of the plurality of groupings; and
   displaying, based on the comparing, an indication of progress along the current route relative to the at least one of the route traversals during traversal of the current route by the mobile computing device.

2. The method of claim 1, wherein applying time series matching to the filtered plurality of route traversals to cluster the plurality of route traversals into the plurality of groupings of route traversals comprises:
   applying dynamic time warping to the filtered plurality of route traversals to cluster the plurality of route traversals into the plurality of groupings of route traversals.

3. The method of claim 1, wherein the route characteristic comprises at least one of: an activity type, a total distance, a distance between a first location and a last location, a centroid distance, or an intersection over union.

4. The method of claim 1, wherein each respective grouping of the plurality of groupings of routes comprises a respective route name.

5. The method of claim 1, further comprising:

detecting, after the current route has ended, a new location of the mobile computing device; and identifying a new respective grouping of the plurality of groupings of route traversals based on the new location.

6. The method of claim 1, wherein the mobile computing device comprises a wearable computing device.

7. A mobile computing device comprising:

a memory; and a processor configured to:

cluster a plurality of route traversals that have been traversed by the mobile computing device into a plurality of groupings of route traversals by:

receiving the plurality of route traversals that have been traversed by the mobile computing device;

pre-filtering the plurality of route traversals based on a route characteristic; and applying time series matching to the filtered plurality of route traversals to cluster the plurality of route traversals into the plurality of groupings of route traversals, wherein each respective grouping includes respective route traversals that are within a threshold distance of each other and correspond to a respective route;

display, based on a current location of the mobile computing device at a first time, a representation of a respective grouping of the plurality of groupings of route traversals, the respective grouping in the subset including at least one of a fastest traversal for the respective route or a most recent traversal for the respective route;

receive, by the mobile computing device, a selection of the displayed representation corresponding to one of the respective grouping of the plurality of groupings;

obtain, at a second time later than the first time and during traversal of a current route by the mobile computing device, an updated current location of the mobile computing device;

compare the updated current location and the second time with at least one of the route traversals of the selected one of the respective grouping of the plurality of groupings; and display, based on the comparing, an indication of progress along the current route relative to the at least one of the route traversals during traversal of the current route by the mobile computing device.

8. The mobile computing device of claim 7, wherein the mobile computing device is a wearable computing device.

9. The mobile computing device of claim 7, wherein the route characteristic comprises at least one of: an activity type, a total distance, a distance between a first location and a last location, a centroid distance, or an intersection over union.

10. The mobile computing device of claim 7, wherein each respective grouping of the plurality of grouping of routes comprises a respective route name.

11. The mobile computing device of claim 7, wherein the processor is further configured to:

detecting, after the current route has ended, a new location of the mobile computing device; and identifying a new respective grouping of the plurality of groupings of route traversals based on the new location.

12. A method comprising obtaining, by a mobile computing device, a previously-stored route traversed by the mobile computing device or another mobile computing device, the previously-stored route comprising a plurality of data points;

identifying, by the mobile computing device, an array of geographic cells encompassing the previously-stored route;

obtaining, by the mobile computing device, a current location of the mobile computing device and a current time;

determining, by the mobile computing device, whether the current location is within any of the geographic cells encompassing the previously-stored route;

responsive to a determination, by the determining, that the current location is within one of the geographic cells encompassing the previously-stored route, filtering the plurality of data points of the previously-stored route to a subset of the plurality of data points that are encompassed within the one of the geographic cells;

searching the subset of the plurality of data points that are encompassed within the one of the geographic cells to identify a location along the previously-stored route that is proximal to the current location;

comparing the current time with a time associated with the identified location along the previously-stored route; and displaying, by the mobile computing device, and based on the comparing, an indication of progress along a current route relative to progress along the previously-stored route.

13. The method of claim 12, wherein the searching further comprises searching another subset of the subset of the plurality of data points that are within a radius of the identified location.

14. The method of claim 13, wherein the plurality of data points include one or more unvisited points not yet associated with the identified location or current route.

15. The method of claim 13, further comprising interpolating at least two nearest data points to identify a time associated with the data points along the previously-stored route.

16. The method of claim 12, wherein obtaining the previously-stored route comprises:

obtaining a first subset of the plurality of data points for the previously-stored route; and obtaining a second subset of the plurality of data points for the previously-stored route when a predetermined number of data points in the first subset have been visited.

17. The method of claim 12, further comprising:

identifying a deviation from the previously-stored route; and providing an indication of the deviation for display by the mobile computing device.

18. The method of claim 12, further comprising:

responsive to another determination, by the determining, that the current location is not within one of the geographic cells encompassing the previously-stored route for a predetermined amount of time, reporting at least one of an expiration or a cancelation of progress along the current route.

19. The method of claim 12, wherein the searching further comprises comparing the identified location to the plurality of data points, along the previously-stored route, based on at least one of a distance along the previously-stored route, a time ahead of the previously-stored route, a time behind the previously-stored route, an altitude, and an average pace.

20. The method of claim 12, wherein the indication of progress comprises at least one of: an estimated time of completion, an indication of a current position along the previously-stored route, a direction toward the previously-stored route, a remaining time for completion, or a remaining distance for completion.

\* \* \* \* \*